No. 845,541. PATENTED FEB. 26, 1907.
R. GATTI.
NON-REFILLABLE BOTTLE.
APPLICATION FILED OCT. 10, 1906.
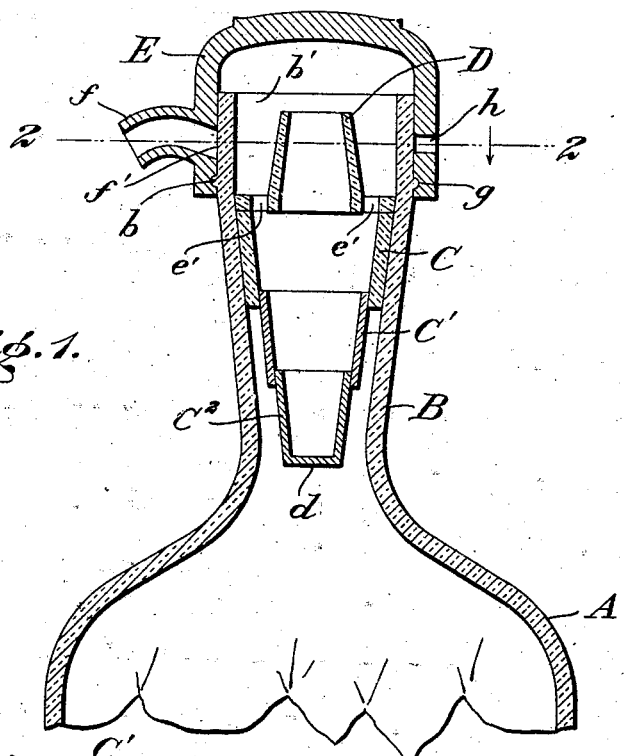
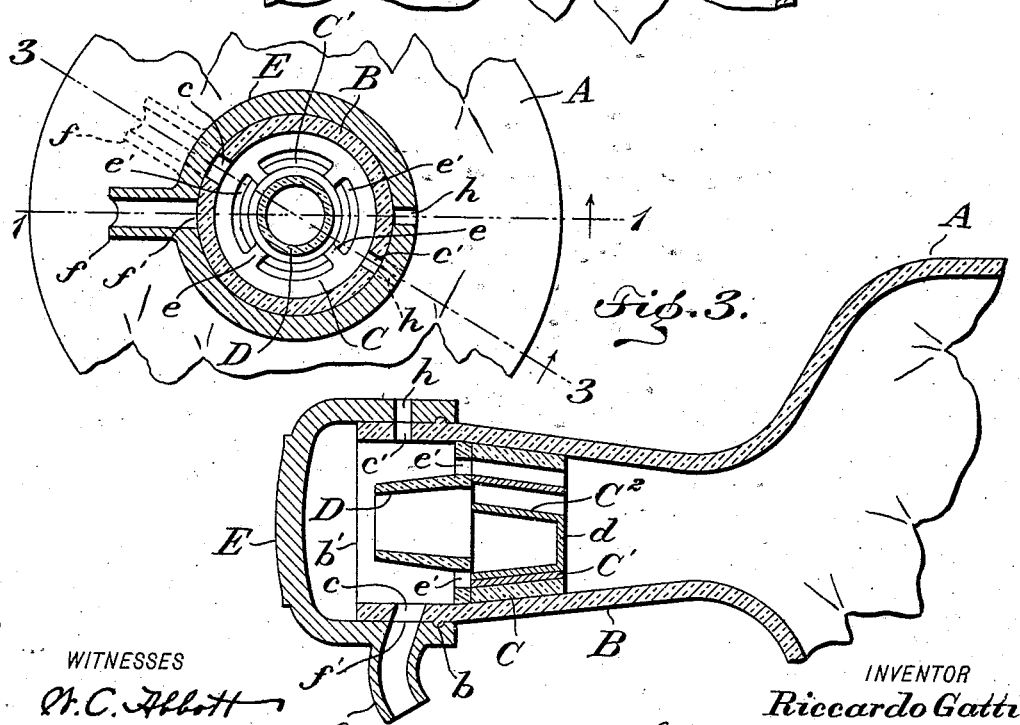
WITNESSES
W. C. Abbott
V. E. Nichols
INVENTOR
Riccardo Gatti
BY Griffino Bernhard
ATTORNEYS

UNITED STATES PATENT OFFICE.

RICCARDO GATTI, OF NEW YORK, N. Y.

NON-REFILLABLE BOTTLE.

No. 845,541.     Specification of Letters Patent.     Patented Feb. 26, 1907.

Application filed October 10, 1906. Serial No. 338,305.

*To all whom it may concern:*

Be it known that I, RICCARDO GATTI, a citizen of the United States, residing at the city of New York, borough of Manhattan, county and State of New York, have invented certain new and useful Non-Refillable Bottles, of which the following is a specification.

This invention is a bottle or other container wherein provision is made for preventing liquid from being reintroduced into the container after the original contents have been withdrawn.

One object of the invention is to provide means which precludes the passage of liquid under pressure or otherwise into the container, enables the liquid present in the container to readily flow therefrom when said container is turned sidewise, and precludes also the introduction of a wire or instrument for opening the parts to permit the operation of refilling the container.

A further object is to readily and freely admit air to the container when pouring liquid therefrom, the devices for these purposes being adjustable to cut off the inflow of air to and the outflow of liquid from said container.

In the accompanying drawings I have shown one embodiment of the invention; but the construction shown therein is to be understood as illustrative only, and not as defining the limits of the invention.

Figure 1 is a vertical section through a non-refillable container constructed in accordance with this invention, the plane of the section being indicated by the dotted line 1 1 of Fig. 2. Fig. 2 is a cross-section on the line 2 2 of Fig. 1, the dotted lines showing the adjustable cap shifted to bring its openings into registration with the air-inlet and the liquid-outlet, respectively, of the container; and Fig. 3 is a section on the line 3 3 of Fig. 2, showing the container adjusted to a pouring position.

A designates a container which as shown is provided with a neck B, the container and its neck being represented as made of glass in one continuous piece, although the particular form of the container and its neck and the material of which said container may be made are not material parts of this invention. The neck B enlarges from the container A toward the upper open end of said neck, and this neck is provided near its upper end with an annular external bead or rib $b$.

The neck is provided between said bead and the open mouth $b'$ with transverse openings $c\ c'$, the former being adapted to serve as an outlet for the liquid and the latter as an inlet for air.

Within the neck B is located or arranged a cut-off or valve adapted to prevent the inflow of liquid should an attempt be made to refill the bottle, said cut-off or valve also preventing the introduction of a wire or instrument for opening the liquid-passage in refilling the container. The cut-off is shown as telescopic, and it consists, preferably, of a plurality of sections, herein shown as three in number and indicated, respectively, by the reference characters C C' $C^2$. The member C is open at its upper and lower ends, and it is shown as tapering internally, said member being secured to the interior of the bottle-neck B, so as to have a fixed position therein, although it will be understood that the member C may be made integral with the neck. The member C' is tapering, and it is open at its upper and lower ends, said member C' being slidable freely within the aforesaid fixed member C. The member $C^2$ is also tapering, and while it is open at its upper end the other end thereof is closed, as by means of a head $d$. The member $C^2$ is smaller than the members C or C', and it is slidable freely within the member C', and it is also slidable with said member C' relative to the fixed member C.

D designates a stop, which projects upwardly from the telescopic cut-off or valve. This stop is shown as being made in a separate piece from the upper end of the member C, said stop D and the member C being joined by webs $e$, which are arranged to leave intervening openings or slots $e'$. (See Fig. 2.) It is evident that the member D may be made in one piece with the member C, and the two parts may be connected by the webs $e$; but this detail of construction may be varied within wide limits. As shown by the drawings, the stop D is hollow or tubular for the purpose of permitting liquid to flow freely through the same, and said stop is, furthermore, arranged centrally within the neck of the bottle and extends upwardly from the member C of the cut-off, the upper portion of said hollow or tubular stop being opposite to the openings $c\ c'$ in the neck B.

E designates a cap which is closed except at its bottom side and except for a pouring-spout $f$. The cap E fits snugly to the neck and mouth portions of the container, and on its inner side said cap is provided with an annular groove $g$, adapted to receive the bead $b$, whereby the cap is connected securely to the container-neck, and at the same time it may be shifted by rotating said cap on the neck. The cap is provided on one side with an opening $h$, which is adapted to register with the opening $c'$ of the neck, and the pouring-spout $f$ communicates with the cap so as to form a port $f'$ on the inner side of the cap, which port is adapted for registration with the liquid-outlet $c$.

The operation is as follows: The container is filled with liquid before the cut-off and the cap are applied thereto, and after completing the filling operation the member C of the cut-off is secured firmly in the neck of the bottle, after which the members $C'$ and $C^2$ are placed in position, and the hollow stop D is secured in place on the member C. The cap E is now applied and connected to the neck of the bottle, and the package or container in a filled condition is ready for use or for the market. When it is desired to draw liquid from the container, the cap E is turned partly around on the neck B for the purpose of bringing the opening $h$ and the spout $f$ into registration with the air-inlet $c'$ and the liquid-outlet $c$, respectively, substantially as shown by Fig. 3. The container is now turned to a pouring position, as also indicated in Fig. 3, and this operation of turning the container causes the members $C'$ $C^2$ to slide one within the other and within the member C, whereby the telescopic cut-off is collapsed, and certain openings or spaces are provided, through which the liquid is free to flow from the chamber of the container and through the opening $c$ and the spout $f$. The movement of the members $C'$ $C^2$ is limited in one direction by the stop D, and when collapsed the members of the telescopic cut-off not only form openings for the outlet of the liquid but also provide passages for the ingress of air to the chamber of the container, the air being free to flow through the alined openings $f$ $c'$ of the cap E and the neck B, respectively, as will be clearly evident by an inspection of Fig. 3.

It will be noted that when the container is turned to a pouring position the parts of the cut-off automatically adjust themselves to provide passages for the outlet of the liquid and the ingress of air.

The operation of pouring off the liquid may be arrested at any time by turning the cap E on the neck B, whereupon the spout $f$ is adjusted out of registration with the liquid-outlet $c$, and the opening $h$ is moved out of registration with the air-inlet $c'$. Furthermore, the stop D provides for the free egress of the liquid, it arrests the movement of the members $C'$ $C^2$ in one direction, and it serves the purpose of preventing a wire or instrument from reaching the members $C'$ $C^2$ for the purpose of keeping them in an open or collapsed position should an attempt be made to refill the bottle.

My container wholly dispenses with the necessity for corking the bottle, because the cap E provides a means for securely closing the bottle, and it may readily be adjusted to pour off liquid without completely inverting the bottle, such cap affording means for the free ingress of air and permitting the liquid to be poured off without spilling the same, the liquid flowing readily from the spout into a glass or other receptacle.

Having thus described my invention, what I claim as new, and desire to secure by Letters Patent, is—

1. In a device of the class described, a sectional cut-off arranged within the mouth or neck of a container.

2. In a device of the class described, a container, and a cut-off within said container, said cut-off having a plurality of members, one of which is slidable relative to the other member or members.

3. In a device of the class described, a container, and a cut-off within said container, said cut-off consisting of a plurality of telescopic members, one of which is closed.

4. In a device of the class described, a container, and a cut-off within said container, said cut-off consisting of a plurality of telescopic members arranged to open and close by gravity, and means for limiting the relative movement of a certain member or members in one direction.

5. In a device of the class described, a container, a telescopic cut-off therein, and a hollow stop in the path of a member or members of said cut-off.

In testimony whereof I have signed my name to this specification in the presence of two subscribing witnesses.

RICCARDO GATTI.

Witnesses:
H. I. BERNHARD,
V. E. NICHOLS.